7898X
J. Beckwith.
Double-Acting Pump.
Patented Dec. 27, 1833.
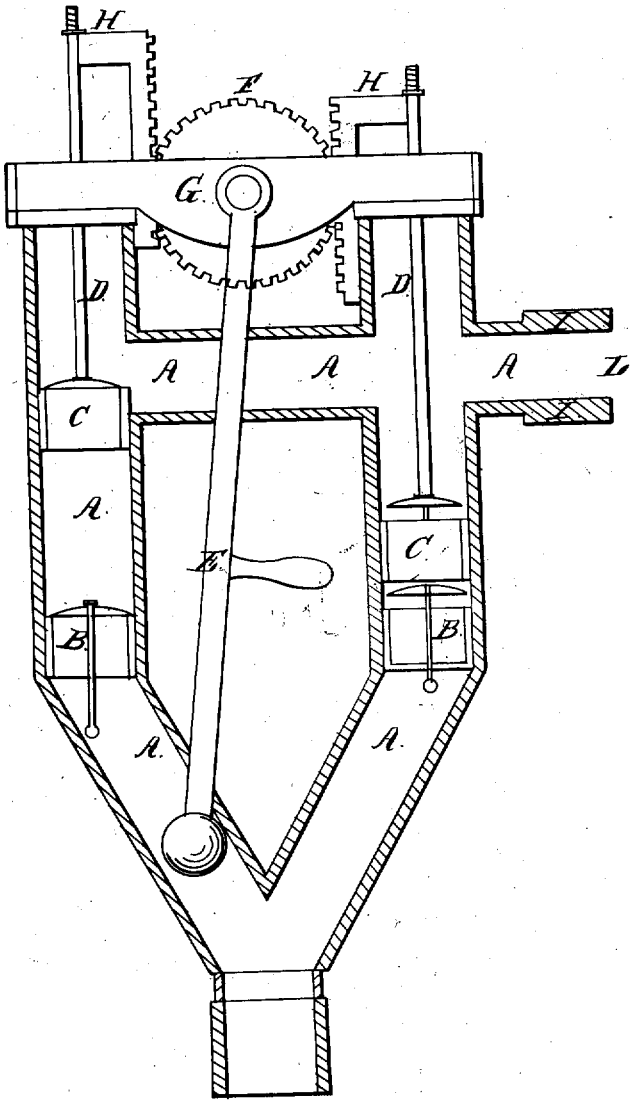

Dec 27, 1833

7898X Jedediah Beckwith.

Letters Patent.

The schedule referred to in these Letters Patent, and making part of the same, containing a description in the words of the said Jedediah Beckwith himself of his Improvement in the Metallic pump To all to whom these presents shall come.

Be it known that I, Jedediah Beckwith of the Town & County of Saratoga, & State of New York, have invented a new & useful Metallic Pump & that the following is a full & exact description of the construction & operation of the said Machine as invented by me.

'A. as exhibited on the accompanying draft represents the tubes thro' which the water passes.... B. represents stationary poppet valves.— C. Moving valves.— D. piston rods attached to moving valves & passing thro' cap G.— E pendulum rod connected with pinion wheel.— F. pinion wheel attached to pendulum rod by a pin passing thro' cap G.— G. Cap overlaying & attached to the tubes H. Rack Attached to piston rods.

I Coupling blocks, to secure suction & discharge pipes.—

K & L. The water is received at K. & discharged at L.——

The machine is moved by an application of power to the pendulum rod, & at each sweep of which the water is drawn in & discharged alternately thro' the tubes.

Jedediah Beckwith Exd [illegible]

Witnesses

R. M. Livingston

Aaron H. Howell (Dr. in port folio)

(226 Words)